(12) United States Patent
Smith et al.

(10) Patent No.: US 7,464,313 B2
(45) Date of Patent: Dec. 9, 2008

(54) HYBRID APPROACH FOR DATA TRANSMISSION USING A COMBINATION OF SINGLE-USER AND MULTI-USER PACKETS

(75) Inventors: Jack A. Smith, Valley View, TX (US); Hao Bi, Lake Zurich, IL (US); Sean M. McBeath, Keller, TX (US); Danny T. Pinckley, Arlington, TX (US); John D. Reed, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 94 days.

(21) Appl. No.: 11/626,858

(22) Filed: Jan. 25, 2007

(65) Prior Publication Data

US 2007/0214400 A1    Sep. 13, 2007

Related U.S. Application Data

(60) Provisional application No. 60/780,666, filed on Mar. 9, 2006.

(51) Int. Cl.
*G08C 25/02* (2006.01)
(52) U.S. Cl. ........................ 714/748; 714/752
(58) Field of Classification Search .............. 714/752, 714/748, 749, 746; 370/329
See application file for complete search history.

(56) References Cited

U.S. PATENT DOCUMENTS

| 6,469,992 | B1 * | 10/2002 | Schieder | 370/329 |
| 6,678,249 | B2 * | 1/2004 | Toskala et al. | 370/236 |
| 6,700,867 | B2 * | 3/2004 | Classon et al. | 370/216 |
| 7,284,179 | B2 * | 10/2007 | Jiang | 714/748 |
| 2002/0004924 | A1 * | 1/2002 | Kim et al. | 714/752 |

* cited by examiner

*Primary Examiner*—Esaw T Abraham
*Assistant Examiner*—Fritz Alphonse
(74) *Attorney, Agent, or Firm*—Brian M. Mancini

(57) ABSTRACT

A technique for transmitting data in a communication network employing Hybrid Automatic Repeat Request includes a first step 502 of grouping data to be transported into a first and second groups in accordance to a decision parameter, such as data size. A next step 504 concatenates data from the first group and encodes into a multi-user packet. A next step 502 encodes the data into a plurality of data packets. A next step 506 assigns available traffic resources to encoded packets. A next step 506 transmits the encoded packets. A next step 510 reassigns a portion of said traffic resources for which a positive acknowledgement has been determined to uninitiated packets or to assist with one or more ongoing transmissions.

20 Claims, 10 Drawing Sheets

HYBRID APPROACH FOR DATA TRANSMISSION USING A COMBINATION OF SINGLE-USER AND MULTI-USER PACKETS

FIELD OF THE INVENTION

The present disclosure relates generally to wireless communications and more particularly to scheduling mobile terminals in wireless communication systems and corresponding methods.

BACKGROUND OF THE INVENTION

One of the most common methods of packaging data for transmission in a digital cellular communication system uses what is known as a "single-user" packet. With a single-user packet, a data set intended for a single user is encoded as a single packet and then transmitted to the intended user using an available transmission resource (i.e., traffic channel). A second type of packet that has seen increased use in recent years is the packet type known as a "multi-user" packet. Multi-user packets are formed by concatenating multiple data sets, each typically intended for a different user, into a single larger data set of multi-user data which is then encoded into a single packet. An example, of transmissions using single and multi-user packets is Voice over Internet Protocol (VoIP).

Typically, the size of the multi-user data set before encoding is equal to the sum of the sizes of the individual data sets, plus the addition of control information to identify which users have information within the multi-user packet, along with how much information that they have and where it is located within the concatenated set. The use of multi-user packets developed as a result of the advantages that they offer when small sets of data need to be transmitted. First, they allow very small packets to be concatenated and efficiently transmitted in a transmission resource which was designed for larger packet sizes. Second, they allow for a single set of error detection bits and encoder tail bits to be used for a group of data sets rather than requiring multiple sets of these overhead bits. Finally, the larger packet sizes which are obtained from the concatenation process enable better effective coding gains to be realized.

Often, the transmission process will employ a technique known as hybrid automatic repeat request (HARQ) in order to improve the performance of the transmission. In a HARQ transmission, the access network (AN), or equivalently base station, transmits an initial transmission to a wireless receiver. Then, it waits for an acknowledgment (ACK) or negative acknowledgment (NAK) indication from the wireless receiver. If the AN receives a NAK, then it repeats the transmission to the wireless receiver or sends additional parity information to the wireless receiver as the second transmission. This process is repeated until either the wireless receiver sends a positive acknowledgment or a pre-determined maximum number of transmissions is attempted without success. Typically, in order to make full use of the transmission capability of the channel, the transmitter may engage in the concurrent transmission of multiple sets of data. For instance, rather than waiting idle while the receiver determines acknowledgement based on the most recent transmission and signals this acknowledgement indication to the transmitter, the transmitter may initiate transmission of a second data set to the same or a different receiver. During the time required for the receiver to determine acknowledgment and signal this acknowledgement to the transmitter, the transmitter may also initiate the transmission of additional data sets to these same or different receivers in order to ensure that the transmitter is never waiting idle for acknowledgements. An example of this is the synchronous hybrid automatic repeat request (S-HARQ) technique employed in the current high rate packet data (HRPD) standard, which establishes a set of four time-division interlaced transmission channels which can be used for the concurrent transmission of four different sets of data. These interlaced transmission channels are sometimes referred to as "HARQ interlaces".

Although HARQ enables improved performance of the radio link, it also introduces a certain amount of uncertainty as to when a positive acknowledgement might be obtained for a particular data set, which can itself introduce its own problems, especially when the data to be delivered is sensitive to delay, i.e. latency issues.

For example, consider a system consisting of N transmission resources that are being used to deliver voice or other delay-sensitive data to U users using the HARQ technique. Data sets arrive for all or some portion of the users on a somewhat periodic basis (e.g., every twenty milliseconds) and each user's data must be conveyed to it before a certain amount of time has passed (e.g., before the next twenty milliseconds has elapsed). In a heavily-loaded system with more users than transmission resources (i.e., U>N), the data sets corresponding to a subset of these users will be selected as the initial group of data sets to begin transmission. The remaining data sets will have to wait until transmission resources become available due to successful acknowledgement by one or more receivers. Once a transmission resource does become available, a latter-initiated data set is at a disadvantage due to its late start against the twenty millisecond maximum delay criterion and the associated limited number of HARQ transmission attempts that are available to it before the delay criterion expires. This ultimately leads to lower capacity in this type of system, since in order to maintain a given quality of service guarantee, the number of users beginning delayed packet starts must be limited.

Thus, there is a need for a method and system for effectively using transmission resources in a manner that mitigates the detrimental effects of late resource assignment and transmission starts in a communication system employing HARQ.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

Skilled artisans will appreciate that many common but well-understood elements that are useful or necessary in a commercially feasible embodiment are not depicted in order to facilitate a less obstructed view of these various embodiments of the present invention.

DETAILED DESCRIPTION OF THE INVENTION

The present invention provides a method and system for effectively using transmission resources in a manner that mitigates the detrimental effects of late resource assignment and transmission starts in a communication system employing HARQ. In particular, the present invention codes said data into a plurality of data packets, each targeted to a single or multiple receivers. At least one traffic resource is assigned to each encoded packet. At least a first transmission of each encoded packet is transmitted, whereinafter a portion of traffic resources for which a positive acknowledgement has not been determined is reassigned to remaining packets of one or more ongoing transmissions.

Advantageously, the present invention aggregates smaller packets of ongoing transmissions into a multi-user packet that is then encoded as a single unit in order to minimize transport overhead. Further, the use of the multi-user packets is dynamically adjusted to take advantage of traffic channels that are released due to early termination by single-user packets, thereby maximizing effective coding rate and link performance.

Figure 1:
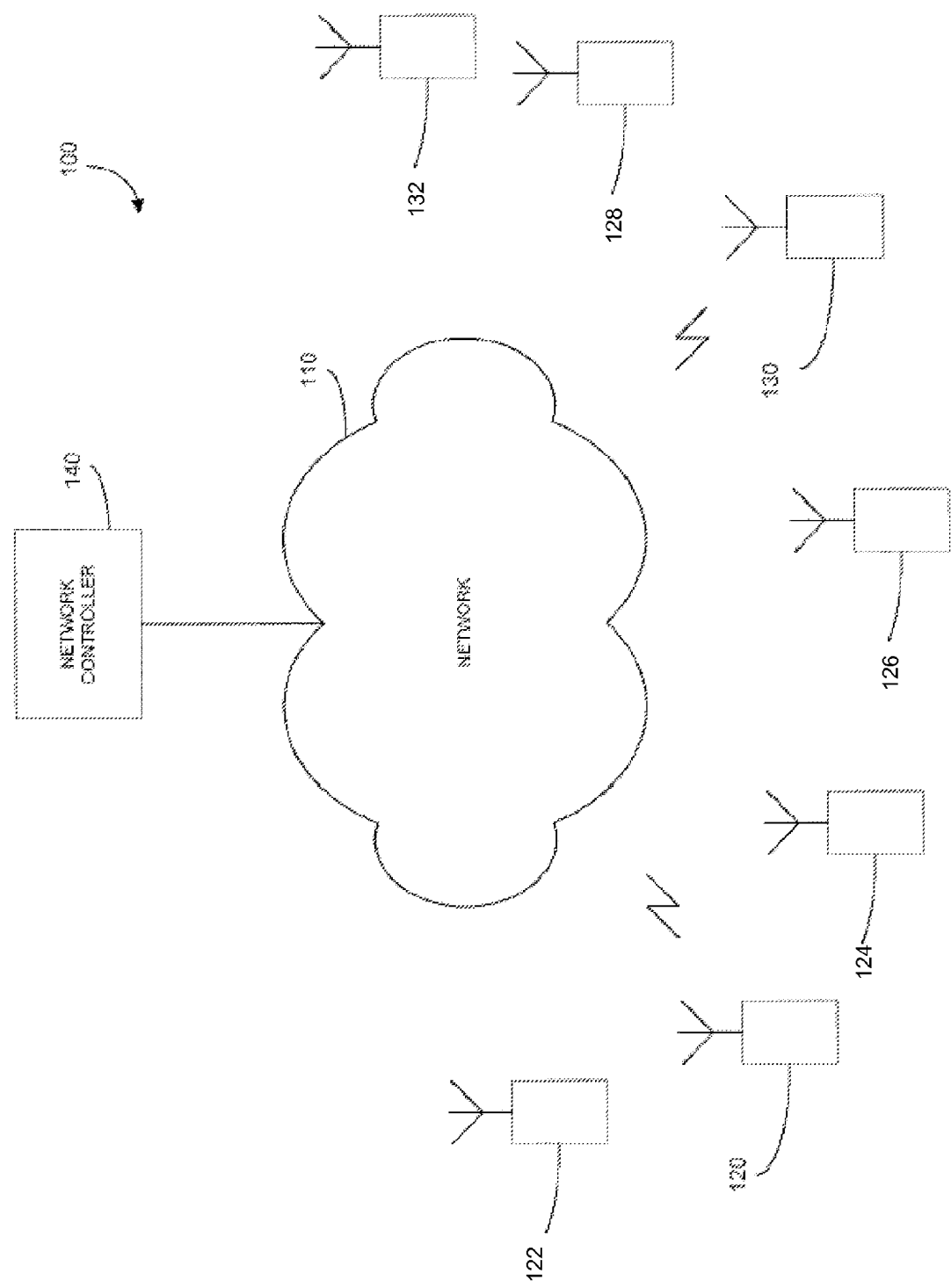
FIG. 1 is an exemplary block diagram of a system in accordance with multiple embodiments of the present invention.

FIG. 1 is an exemplary block diagram of a system 100 in accordance with multiple embodiments of the present invention. The system 100 can include a network controller 140, a network 110, and one or more wireless receivers 120, 122, 124, 126, 128, 130, and 132. Wireless receivers 120, 122, 124, 126, 128, 130, and 132 may be wireless communication devices such as access terminals, wireless telephones, cellular telephones, personal digital assistants, pagers, personal computers, mobile communication devices, or any other device that is capable of sending and receiving communication signals on a wireless network.

In an exemplary embodiment, the network controller 140 is connected to the network 110 and comprises a processing unit (not shown) and network interface (not shown) for communicating with network 110, for example. The controller 140 can be located at an access network (AN), at a radio network controller, or anywhere else on the network 110. The network 110 can include any type of network that is capable of sending and receiving wireless signals. For example, the network 110 can include a wireless telecommunications network, a cellular telephone network, a satellite communications network, and other like communications systems. Furthermore, the network 110 can include more than one network and can include a plurality of different types of networks. Thus, the network 110 can include a plurality of data networks, a plurality of telecommunications networks, a combination of data and telecommunications networks and other like communication systems capable of sending and receiving communication signals.

In operation, the network controller 140 can assign time domain resource on a traffic channel to wireless receivers 120, 122, 124, 126, 128, 130, and 132, by sending an indication to the wireless receivers 120, 122, 124, 126, 128, 130, and 132 of the time domain resource. The traffic channel can be any channel that carries information for the wireless receiver. It can be at least one subchannel, or a subset of at least one subchannel. The subset can be defined using any multiple access scheme, such as frequency division multiple access (FDMA), time division multiple access (TDMA), code division multiple access (CDMA), or combinations of the above. The network controller 140 can be located at an AN and can send the indication using the control channel. The time domain assignments can be one or more contiguous time slots and can have a repeating pattern.

The control channel can be any channel used to carry information about the traffic channel. The control channel can be on a different Walsh code, in a different time slot, in a different orthogonal frequency division multiplexing (OFDM) symbol time, in a different set of OFDM subcarriers, sent as a preamble to the traffic channel, sent as a header to a multiple user packet, combinations of the items above, and the like. The control channel can be shared among a plurality of receivers or dedicated to one wireless receiver. The control channel can be transmitted concurrently with the data or in a previous time slot or previous subframe.

Figure 2:
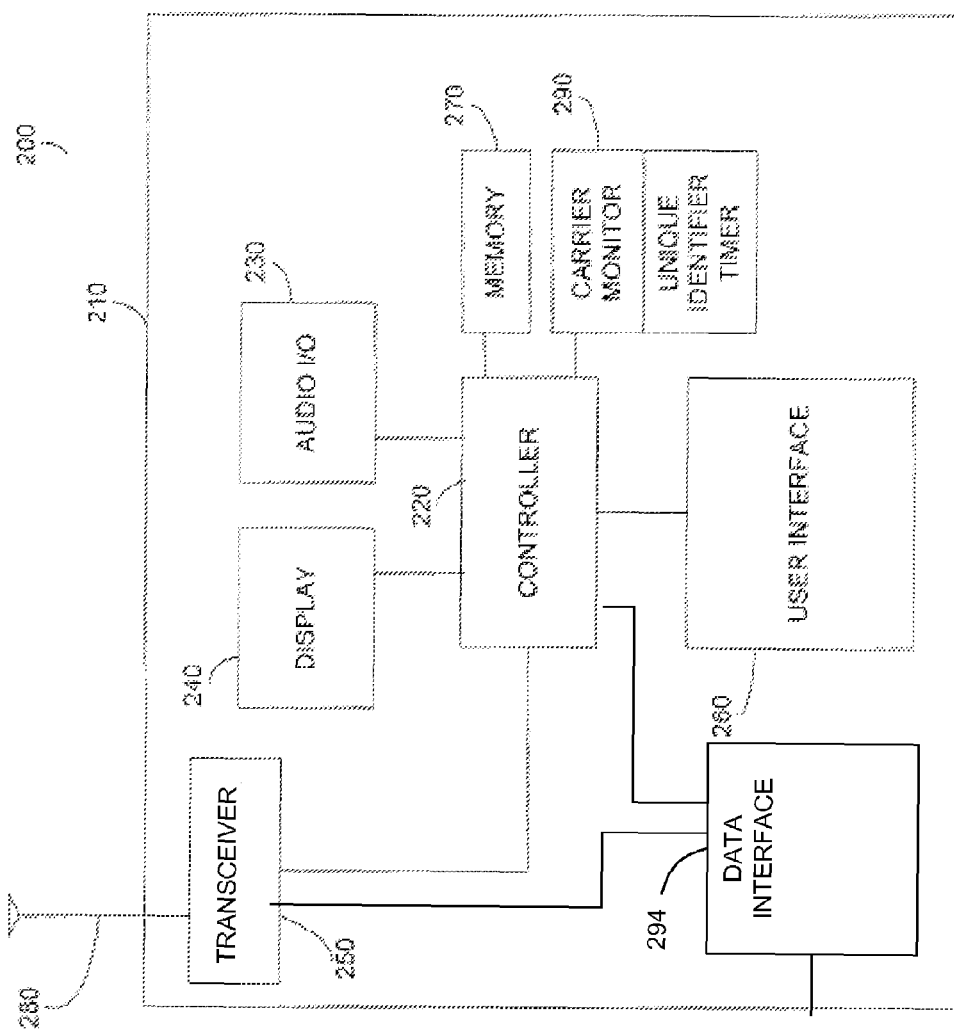
FIG. 2 is an exemplary block diagram of a wireless communication device in accordance with multiple embodiments of the present invention.

FIG. 2 is an exemplary block diagram of a wireless communication device 200, such as the wireless receivers 120, 122, 124, 126, 128, 130, or 132, in accordance with multiple embodiments of the present invention. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. Some of the processing components of device 200 can be generally referred to as a processing unit (not shown). Depending on the embodiment, such a processing unit can include some or all of controller 220, and memory 270, for example. The wireless communication device 200 can also include a data interface device 294 for receiving and sending data from and to external data communications devices, for example, computers.

The display 240 can be a liquid crystal display (LCD), a light emitting diode (LED) display, a plasma display, or any other means for displaying information. The transceiver 250 can include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 can include a random access memory, a read only memory, an optical memory, a subscriber identity module memory, or any other memory that can be coupled to a wireless communication device.

In operation, the controller 220 can control the operations of the wireless communication device. The transceiver 250 can include a receiver configured to receive a control channel. In some embodiments, the controller 220 can decode the control channels, broadcast channels, multiple user packets, or the like. The controller can further process such channels when it finds its unique identifier, possibly embedded as part of a control channel, broadcast channel, multiple user packet, and the like.

The unique identifier can be a mobile communication device or access terminal identification number, a subscriber identity, or any other identifier that can be used to uniquely identify a wireless receiver. For example, the unique identifier can be a medium access control index (MAC Index). The controller 220 can then decode or otherwise process packets or other forms of data or control information corresponding to the assigned unique identifier is found.

The concepts and methodologies associated with this invention are best illustrated by example. Note that although the following examples choose specific slot durations, number of HARQ interlaces, and numerous other parameters, other values could easily be selected and are within the scope of this invention.

Figure 3:
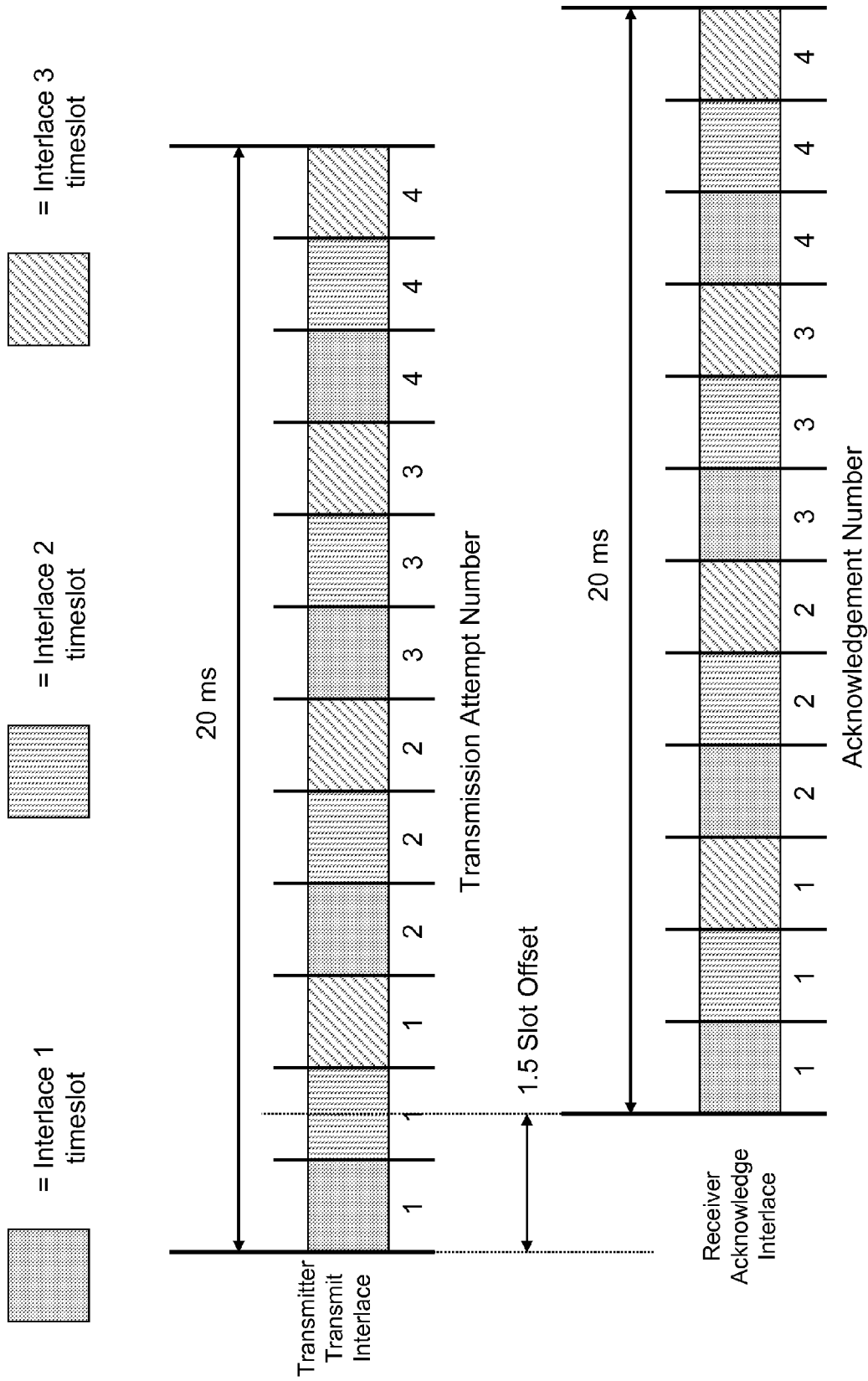
FIG. 3 is an exemplary diagram of a transmission scheme in accordance with one embodiment of the present invention.

FIG. 3 is an exemplary diagram of a transmission scheme in accordance with one embodiment of the present invention. In this illustrative example, each twenty milliseconds of time domain resource has been divided into twelve contiguous timeslots. The twelve transmission timeslots have then been used to establish a set of three HARQ interlaces, with a maximum of four transmission attempts possible on each interlace. The receiver provides indication of acknowledgement using a similar time structure, with an offset of one-and-one-half slots in order to provide time for decoding the transmission, determining acknowledgement, and transmitting the determined acknowledgement. Note that each HARQ interlace can be used to transmit a different data set. In addition, each HARQ interlace can be further subdivided into N1 independent transmission resources for the simultaneous transmission of N2 independent data sets.

Figure 4:
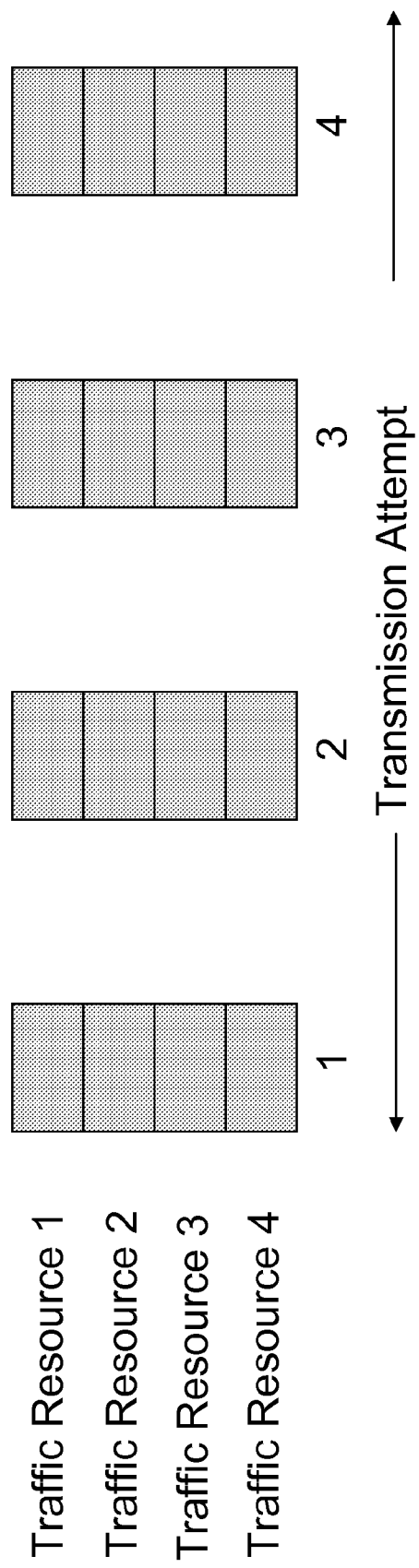
FIG. 4 is an exemplary diagram of the HARQ interlace 1 illustrated in FIG. 3.

FIG. 4 is an exemplary diagram of HARQ interlace 1 that was illustrated in FIG. 3. Note that in FIG. 4, HARQ interlace 1 has been further subdivided into four different transmission resources using either code division multiple access, time division multiple access, frequency division multiple access, combinations of the same, or any other suitable multiple access scheme. Each of these four transmission resources can be dedicated for the transmission of a different data set.

Figure 5:
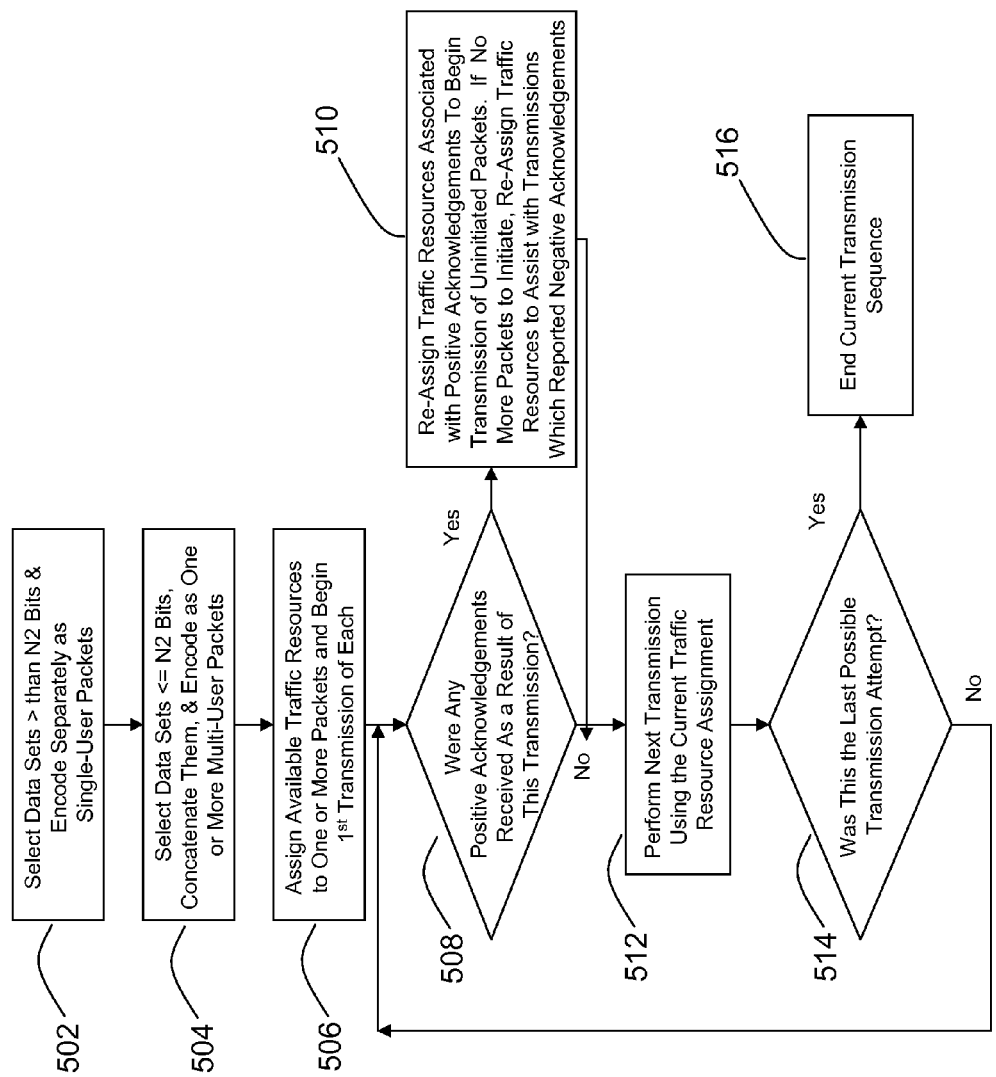
FIG. 5 is an exemplary diagram of a resource assignment algorithm, in accordance with the present invention.

FIG. 5 is an exemplary diagram of a possible resource assignment algorithm. Note that while this example algorithm uses the size of the various data sets to be transmitted as the decision mechanism for grouping the data sets and determining which data sets are encoded as single-user packets and which data sets are encoded as multi-user packets, other decision parameters such as latency requirements, data application type, method of coding, etc. could also be used and are within the scope of this invention. Also, while the example algorithm automatically re-assigns traffic resources released through positive acknowledgement to multi-user packet transmissions, other assignment rules also apply and are within the scope of this invention.

In a first step 502, the size of the data of each transmission, i.e. independent data set is examined and compared against a threshold, N2 bits. These data sets are grouped into first and second groups in accordance with the size of each data set. For example, the first group can consist of those data sets with a size smaller than or equal to N2 bits, and the second group can consist of those data sets with a size larger than N2 bits. Although the decision parameter used in this example is date set size, it should be recognized that the decision parameter could be latency requirements, data application type, method of coding, a combination of such, or any other parameter that could provide more efficient traffic channel utilization by separating out data sets to be combined into multi-user packets. In the example herein, the smaller data sets (<=N2) can benefit by being concatenated into multi-user packets (step 504) while larger data sets (>N2) can be transmitted normally (step 502) as single-user packets.

In either case, there may be insufficient resources to transmit all the data sets at the same time. As a result, the present invention provides that the available traffic resources are assigned 506 to one or more packets of the data sets, and transmission of those data packets is begun. Remaining packets of data sets must wait until a traffic resource becomes available, i.e. a positive acknowledgement of proper receipt of a packet is received. If a positive acknowledgment is received 508 this means that a packet has been properly received and another remaining packet can be sent. In this event, that particular traffic resource has now become available, and it can be reassigned to begin a new packet or assist with other ongoing transmissions which have reported negative or no acknowledgments 510.

If a positive acknowledgement is not received 508 then the process resumes by performing another transmission 512 of packets using the current traffic resource assignment profile, which is repeated until the last possible transmission attempt of the packet is performed 514, whereupon the transmission is terminated 516.

Figure 6:
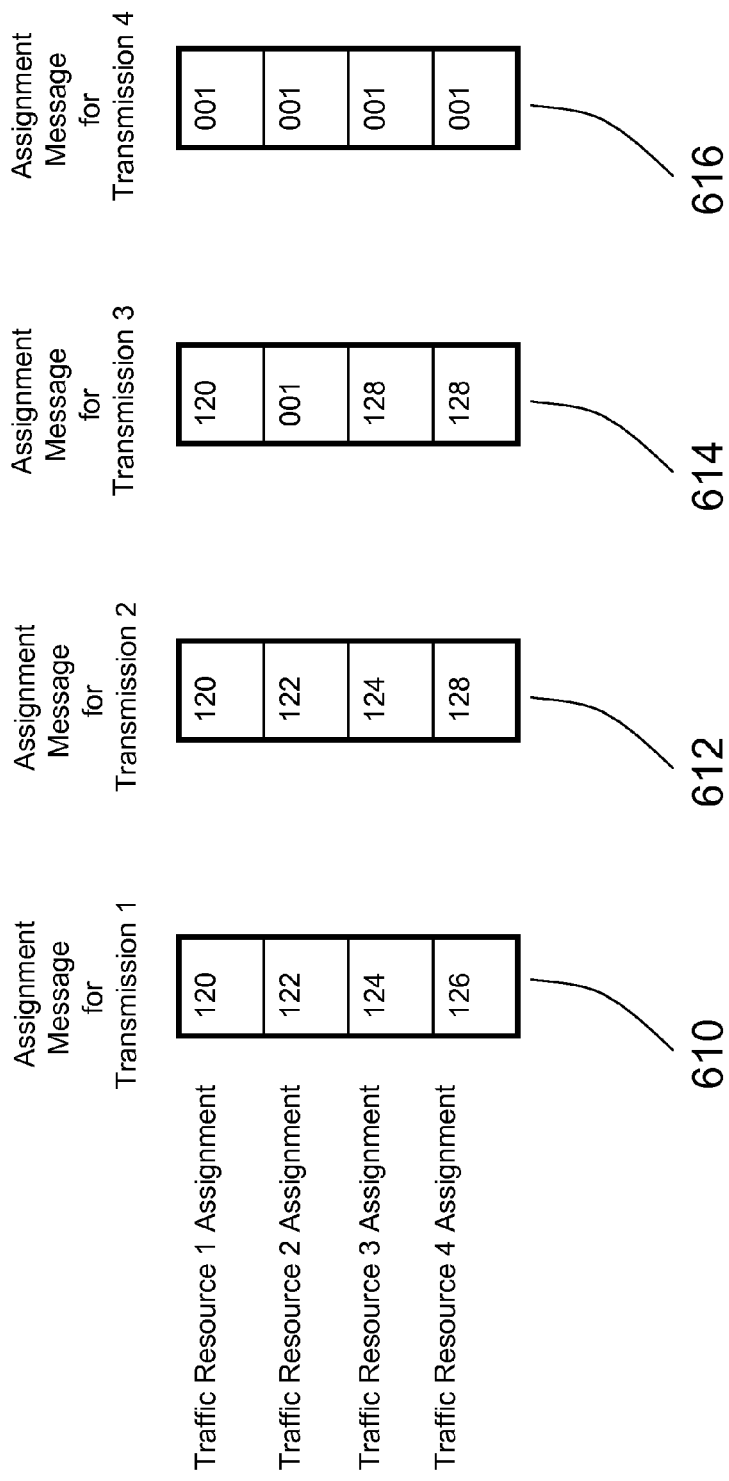
FIG. 6 is an exemplary diagram of a resource assignment message that is used to inform the various receivers of the current assignment of traffic resources, in accordance with the present invention.

FIG. 6 is an exemplary diagram of a possible resource assignment message that is used to inform the various receivers of the current assignment of traffic resources. Each assignment message basically consists of an entry for each traffic resource that identifies either the identification number of the receiver for which the traffic resource is assigned during the current transmission or an entry indicating that the traffic resource is being used to transmit a multi-user packet. In FIG. 6, the indication of a first multi-user packet is accomplished using a receiver identification number of "001", indication of a second multi-user packet is accomplished using a receiver identification number of "002", specific receiver identifications are indicated with receiver identification numbers greater than "002", and a non-assigned traffic resource would be indicated with a receiver identification of "000". Note that each resource assignment message could be sent on a separate dedicated control channel, could be transmitted as part of the transmitted traffic, or combinations of the two. Note also that this type of resource assignment message is for illustrative purposes only, and other types and formats of resource assignment messages can be used and are within the scope of this invention. One example of another type of resource assignment message that is likely to be employed is the bitmap representation message, where a bitmap is constructed using one or more bits in specific positions within the map to indicate a transmission characteristic, such as the traffic resource or traffic resources assigned to each receiver, as well as possibly the size of the transmission, coding rate, or numerous other parameters related to the transmission. Note that the resource assignment message used for the multi-user packet may in a format similar to that indicated in FIG. 6, may be a bitmap representation, or any appropriate format for signaling the assignment of resources within the multi-user packet. In addition, the resource assignment message used for the multi-user packet may take advantage of the information contained in other control messages in order to reduce the size of said multi-user packet resource assignment message. For example, receivers that have been assigned traffic resources for single user packet transmissions may be omitted from the bitmap representation when the presence of a single user packet transmission eliminates the possibility of having been assigned resources within the multi-user packet.

Figure 7:
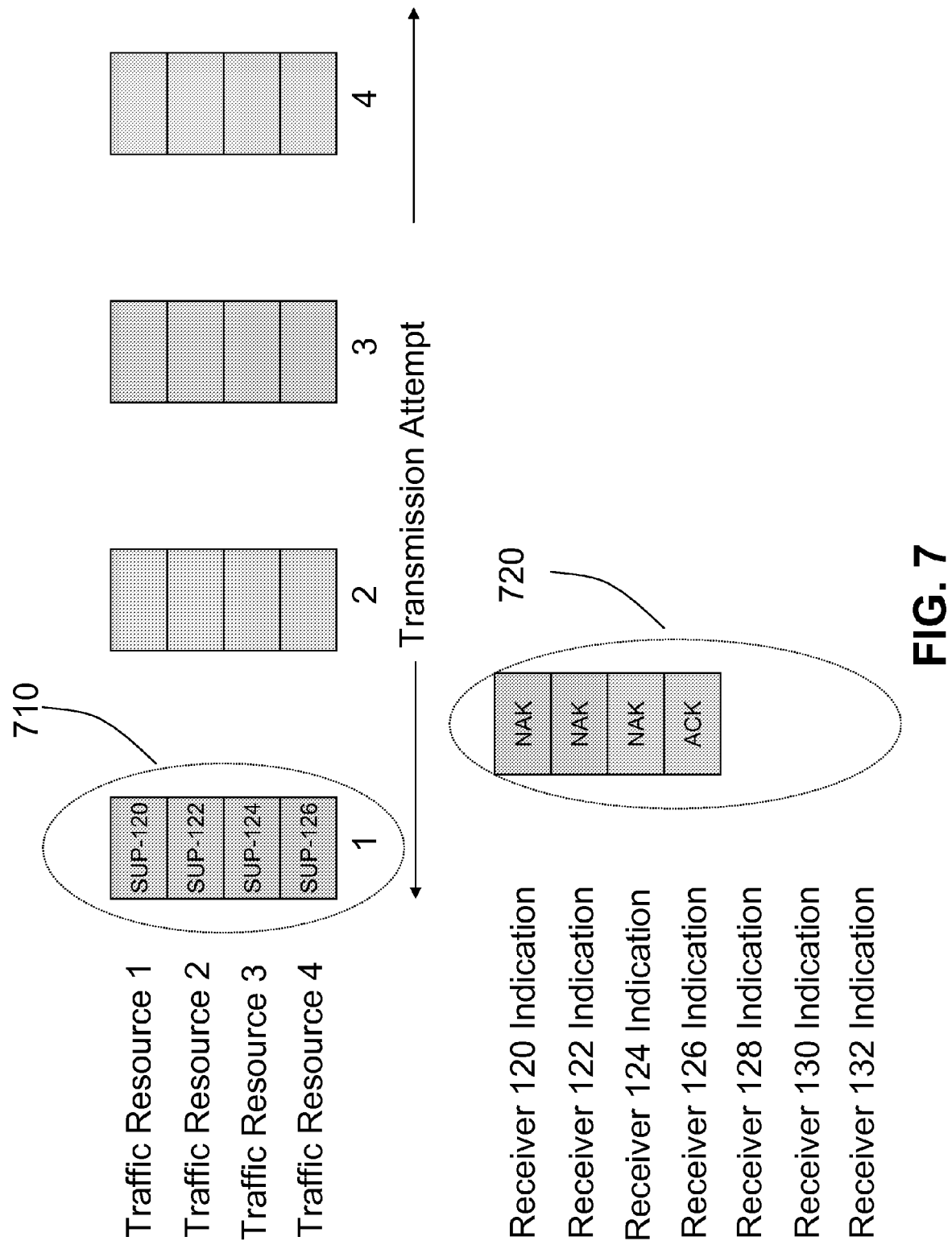
FIG. 7 is an exemplary diagram of a first transmission corresponding to HARQ interlace 1, in accordance with the present invention.

FIG. 7 is an exemplary diagram of a possible first transmission corresponding to HARQ interlace 1 and indicated using resource assignment message (610 in FIG. 6). In this illustration, a data set targeted for a receiver (120 in FIG. 1) has been coded and the initial transmission is transmitted using traffic resource 1. A data set targeted for another receiver (122 in FIG. 1) has been coded and the initial transmission is transmitted on traffic resource 2. A data set targeted for another receiver (124 in FIG. 1) has been coded and the initial transmission is transmitted on traffic resource 3. Finally, a data set targeted for another receiver (126 in FIG. 1) has been coded and the initial transmission is transmitted on traffic resource 4. Note that after the first transmission is complete, receiver 126 returns a positive acknowledgement (ACK) indication to the transmitter, while receiver 120, receiver 122, and receiver 124 provide negative acknowledgement (NAK) indications to the transmitter.

Figure 8:
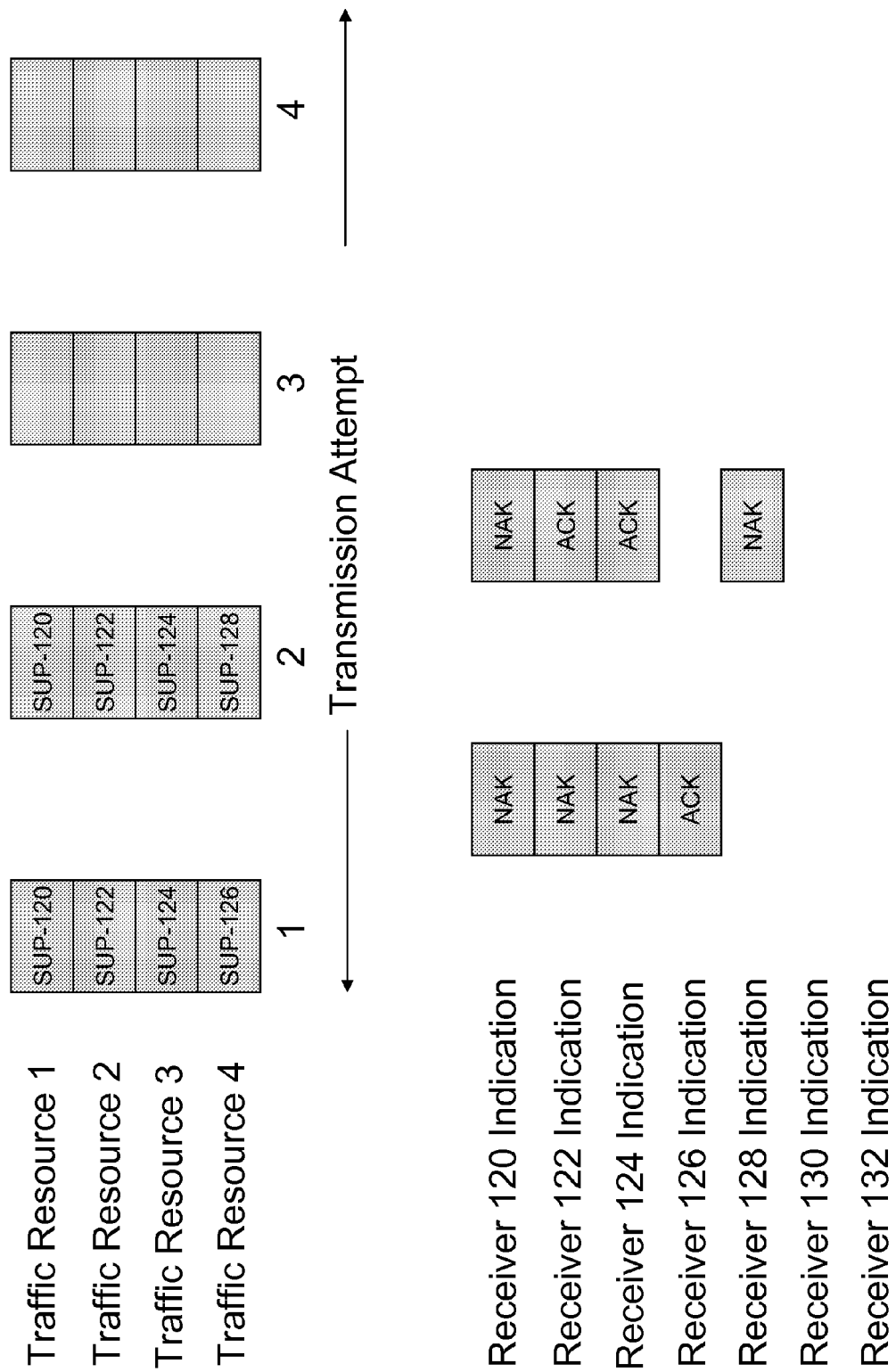
FIG. 8 is an exemplary diagram of a second transmission corresponding to HARQ interlace 1, in accordance with the present invention.

FIG. 8 is an exemplary diagram of a possible second transmission corresponding to HARQ interlace 1 and indicated using resource assignment message (612 in FIG. 6). In this illustration, after having received positive acknowledgement from receiver 126, network controller 140 reassigns traffic resource 4 for use in the transmission of a data set for a receiver (128 in FIG. 1) for which a transmission resource was not available when the first transmissions were initiated for receivers 120, 122, and 124. Network controller 140 then begins transmission of the second transmission to receiver 120 on traffic resource 1, the second transmission to receiver 122 on traffic resource 2, the second transmission to receiver 124 on traffic resource 3, and the initial transmission to receiver 128 on traffic resource 4. As depicted in FIG. 8, after the second transmission is completed, receiver 122 and receiver 124 provide a positive acknowledgement (ACK) to the transmitter, while receiver 120 and receiver 128 provide negative acknowledgements (NAK).

Figure 9:
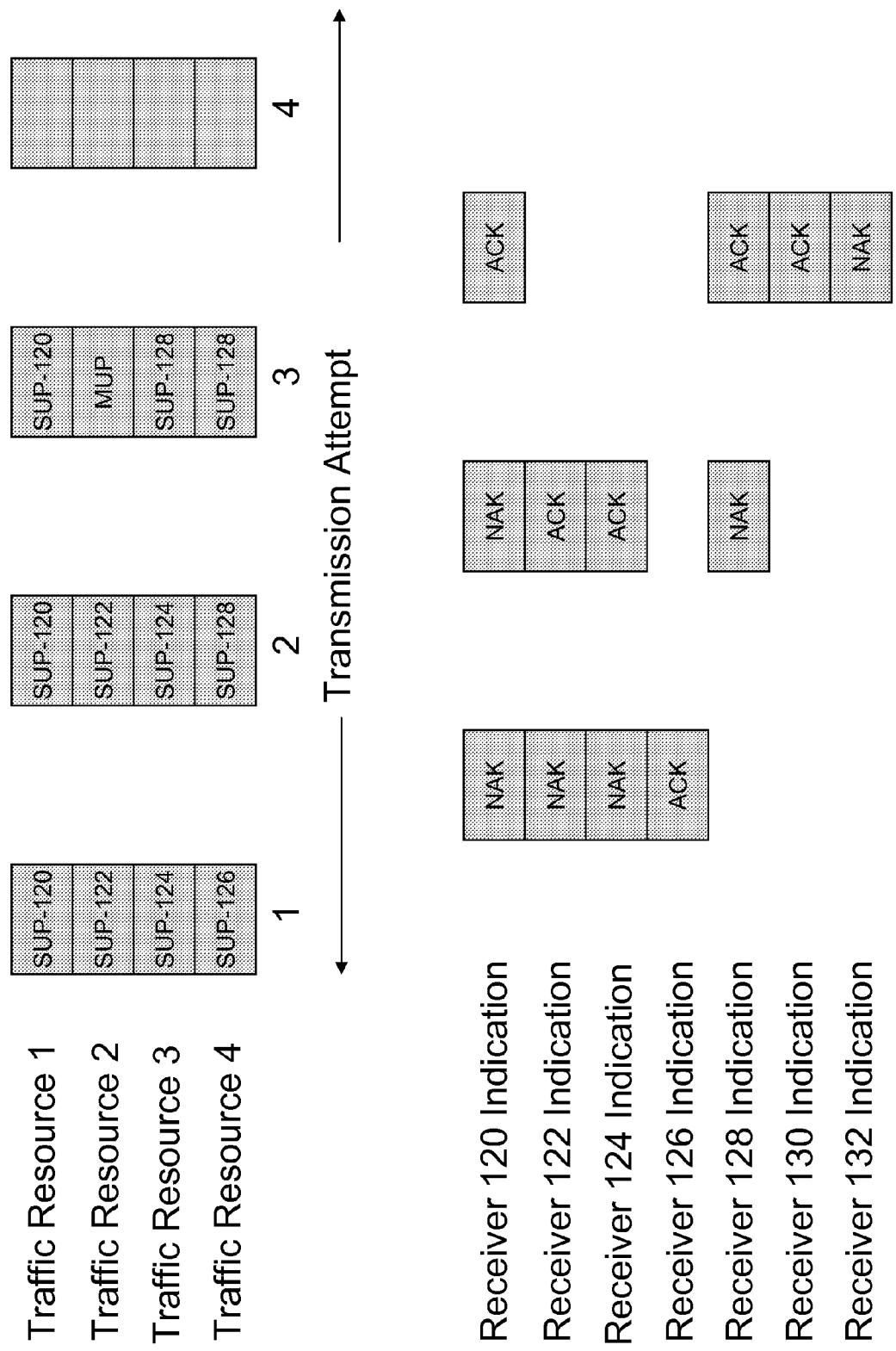
FIG. 9 is an exemplary diagram of a third transmission corresponding to HARQ interlace 1, in accordance with the present invention.

FIG. 9 is an exemplary diagram of a possible third transmission corresponding to HARQ interlace 1 and indicated using resource assignment message (614 in FIG. 6). In this illustration, a data set targeted for another receiver (130 in FIG. 1) and a data set targeted for another receiver (132 in FIG. 1) have been concatenated into an appropriate multi-user packet, encoded, and the network controller 140 has scheduled the first transmission of this multi-user packet on traffic resource 2, which has been released after having received positive acknowledgement from receiver 122. Also, after having received positive acknowledgements from receiver 124, network controller 140 reassigns traffic resource 3 for use in initiating a single-user packet transmission to assist with the transmission of the single-user packet that was originated on traffic resource 4 in transmission 2. Network controller 140 then begins transmission of the third transmission to receiver 120 on traffic resource 1, and the first transmission of the multi-user packet transmission to receiver 130 and receiver 132 on traffic resource 2, and the second transmission to receiver 128 on traffic resource 3 and traffic resource 4. Note that the additional information provided to receiver 128 on traffic resource 3 may be in the form of a duplicate of the information transmitted on traffic resource 4 or it may be different information such as additional parity bits obtained through the encoding process that may or may not be transmitted in the absence of additional traffic resources such as traffic resource 3. As depicted in FIG. 9, after the third transmission is completed, receiver 120 and receiver 128 and receiver 130 provide a positive acknowledgement (ACK) to the transmitter, while receiver 132 provides a negative acknowledgement (NAK).

Figure 10:
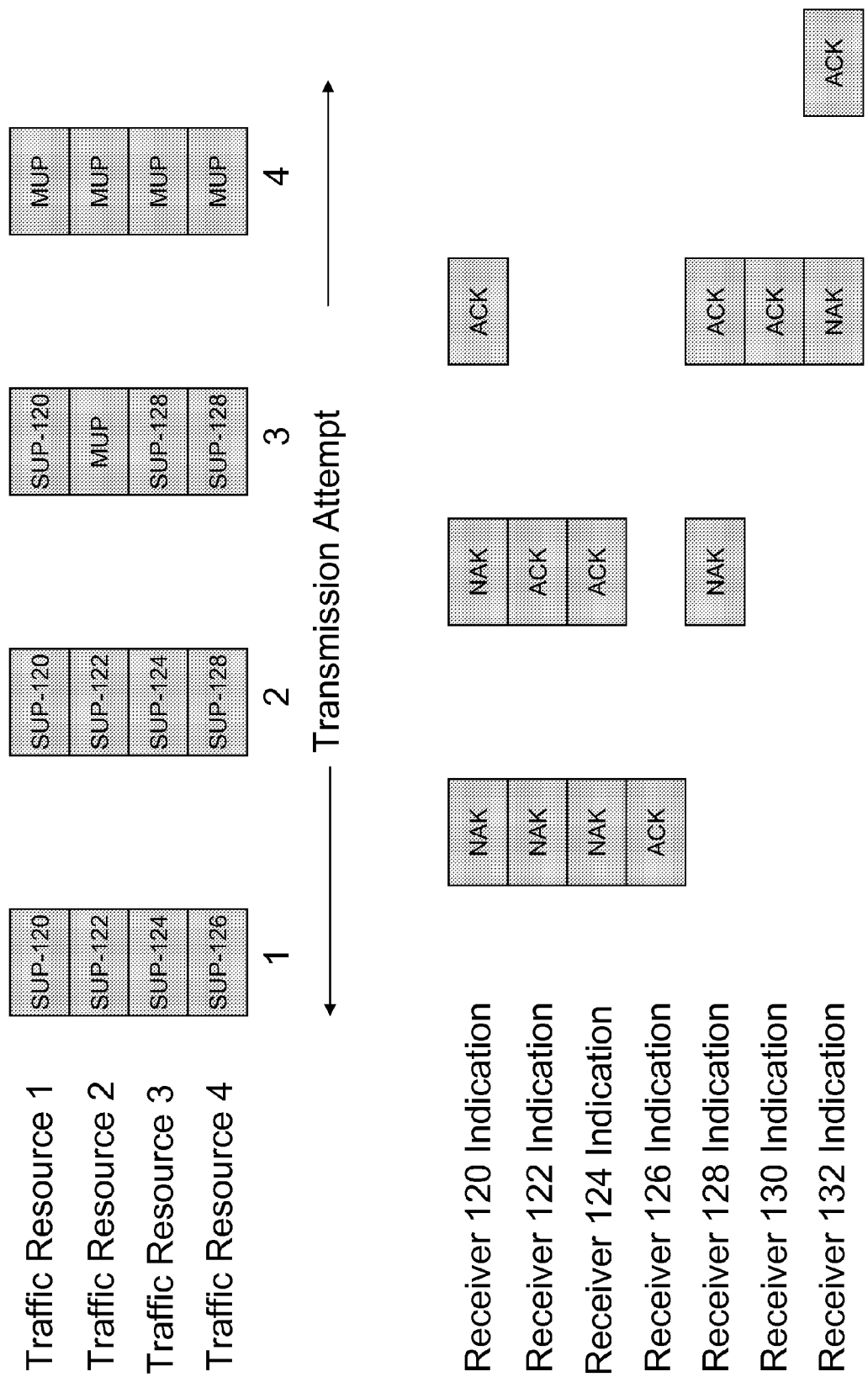
FIG. 10 is an exemplary diagram of a fourth transmission corresponding to HARQ interlace 1.

FIG. 10 is an exemplary diagram of a possible fourth transmission corresponding to HARQ interlace 1 and indicated using resource assignment message (616 in FIG. 6). In this illustration, after having received positive acknowledgement from receiver 120 and positive acknowledgement from receiver 128 and positive acknowledgement from receiver 130, network controller 140 reassigns traffic resource 1 and traffic resource 3 and traffic resource 4 for use in assisting with the transmission of the multi-user packet that was originated on traffic resource 2 in transmission 3. Network controller 140 then begins transmission of the second transmission of the multi-user packet transmission to receiver 132 on traffic resource 1, traffic resource 2, traffic resource 3, and traffic resource 4. As depicted in FIG. 10, after the fourth transmission is completed, receiver 132 provides a positive acknowledgement to the transmitter.

The present invention has an advantageous implementation in VoIP systems, for example, by providing efficient transport of voice or other low-to-medium rate data traffic in an OFDM system. The approach described above provides a very efficient method of such transportation, with the following benefits: a) low signaling overhead due to the use of group scheduling and bit-map representations of channel assignments, b) maximized resource use due to the trunking of traffic channels across a pool of access terminals, c) minimal link overhead due to the use of multi-user packets to aggregate and transport the smallest packet data units using a single CRC and encoder tail allowance, accompanied by enhanced coding gain from the larger packet size, and d) maximum link performance due to the manner in which the multi-user packet coding dynamically adjusts in order to take advantage of traffic channels released through HARQ early terminations.

The method of this disclosure is preferably implemented on a programmed processor. However, the controllers, flowcharts, and modules can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, and the like. In general, any device on which resides a finite state machine capable of implementing the embodiments described above and/or the claims below can be used to implement the processor functions of this disclosure.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but can include other elements not expressly listed or inherent to such process, method, article of manufacture, or apparatus.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "computer program", and "computer instructions", as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for transmitting data in a communication network employing Hybrid Automatic Repeat Request, said method comprising the steps of:
grouping data to be transported into a first group of single-user packets and a second group of a multi-user packet in accordance to a decision parameter;
concatenating and encoding the data from the first group into a multi-user packet;
encoding the data into a plurality of data packets;
assigning at least one traffic resource to each encoded packet;
transmitting at least a first transmission of the encoded packets; and
reassigning a portion of said at least one traffic resource for which a positive acknowledgement has been determined to remaining packets of one or more ongoing transmissions that have not reported a positive acknowledgment.

2. The method of claim 1, wherein the encoding step includes encoding the second group of data as single-user packets.

3. The method of claim 1, wherein the assigning step includes the multi-user packets being used in the ongoing transmissions.

4. The method of claim 1, wherein the encoding step includes encoding a portion of the data packets as single-user packets and encoding a portion of the data packets as multi-user packets.

5. The method of claim 1, wherein the assigning step indicates only which traffic resources are assigned to single-user packets.

6. The method of claim 1, wherein the decision parameter of the grouping step is data set size.

7. The method of claim 1 wherein the decision parameter of the grouping step is selected from one of the group of latency requirements, data application type, and method of coding.

8. The method of claim 1, wherein the assigning step includes a bitmap representation message, wherein a bitmap is constructed using one or more bits in specific positions within the map to indicate a transmission characteristic.

9. A method for transmitting data in a communication network employing Hybrid Automatic Repeat Request, the method comprising the steps of:
grouping data to be transported into a first group of single user packets and a second group of a multi-user packet in accordance to a data set size;
concatenating and encoding data from the first group into a multi-user packet;
encoding data for the second group into as many single user packets as there are users in the second group;
assigning at least one traffic resource to each encoded packet;
transmitting at least a first transmission of the encoded packets; and
reassigning a portion of said at least one traffic resource for which a positive acknowledgement has been determined to remaining packets of one or more ongoing multi-user packet transmissions that have not reported a positive acknowledgment.

10. The method of claim 9, wherein the data having a data set size less than a threshold is grouped into the first group and data having a data set size greater than a threshold is grouped into the second group.

11. The method of claim 9, wherein the assigning step includes a bitmap representation message, wherein a bitmap is constructed using one or more bits in specific positions within the map to indicate a transmission characteristic selected from one of the group of a traffic resource, a traffic resource assigned to each receiver, a size of the transmission, and a coding rate.

12. The method of claim 11, wherein receivers that have been assigned traffic resources for single user packet transmissions may be omitted from the bitmap representation when the presence of a single user packet transmission eliminates the possibility of having been assigned resources within the multi-user packet.

13. A system for transmitting data in a communication network employing Hybrid Automatic Repeat Request, the system comprising:
sets of data to be transmitted, the sets of data are;
a network controller operable to encode the data into a plurality of data packets and assign at least one traffic resource to each encoded packet; and
an access network operable to; group the data into a first group of single-user packets and a second group of a multi-user packet in accordance to a decision parameter, concatenate data from the first group, encode the data from the first group into a multi-user packet, and transmit at least a first transmission of the encoded packets, wherein
the network controller is operable to reassign a portion of said at least one traffic resource for which a positive acknowledgement has been determined to remaining packets of one or more ongoing transmissions that have not reported a positive acknowledgment.

14. The system of claim 13, wherein the second group of data packets are encoded as single-user packets.

15. The system of claim 13, wherein the data packets being used in the ongoing transmissions are multi-user packets.

16. The system of claim 13, wherein a portion of the data packets are encoded as single-user packets and a portion of the data packets are encoded as multi-user packets.

17. The system of claim 13, wherein the network controller indicates only which traffic resources are assigned to single-user packets.

18. The system of claim 13, wherein the decision parameter is data set size.

19. The system of claim 13 wherein the decision parameter is selected from one of the group of latency requirements, data application type, and method of coding.

20. The system of claim 13, farther comprising a bitmap representation message, wherein a bitmap is constructed using one or more bits in specific positions within the map to indicate a transmission characteristic.

* * * * *